Oct. 21, 1924.
W. P. THORNTON
1,512,320
PROCESS OF EXTRACTING SULPHUR FROM ORE
Filed June 4, 1919   3 Sheets-Sheet 1
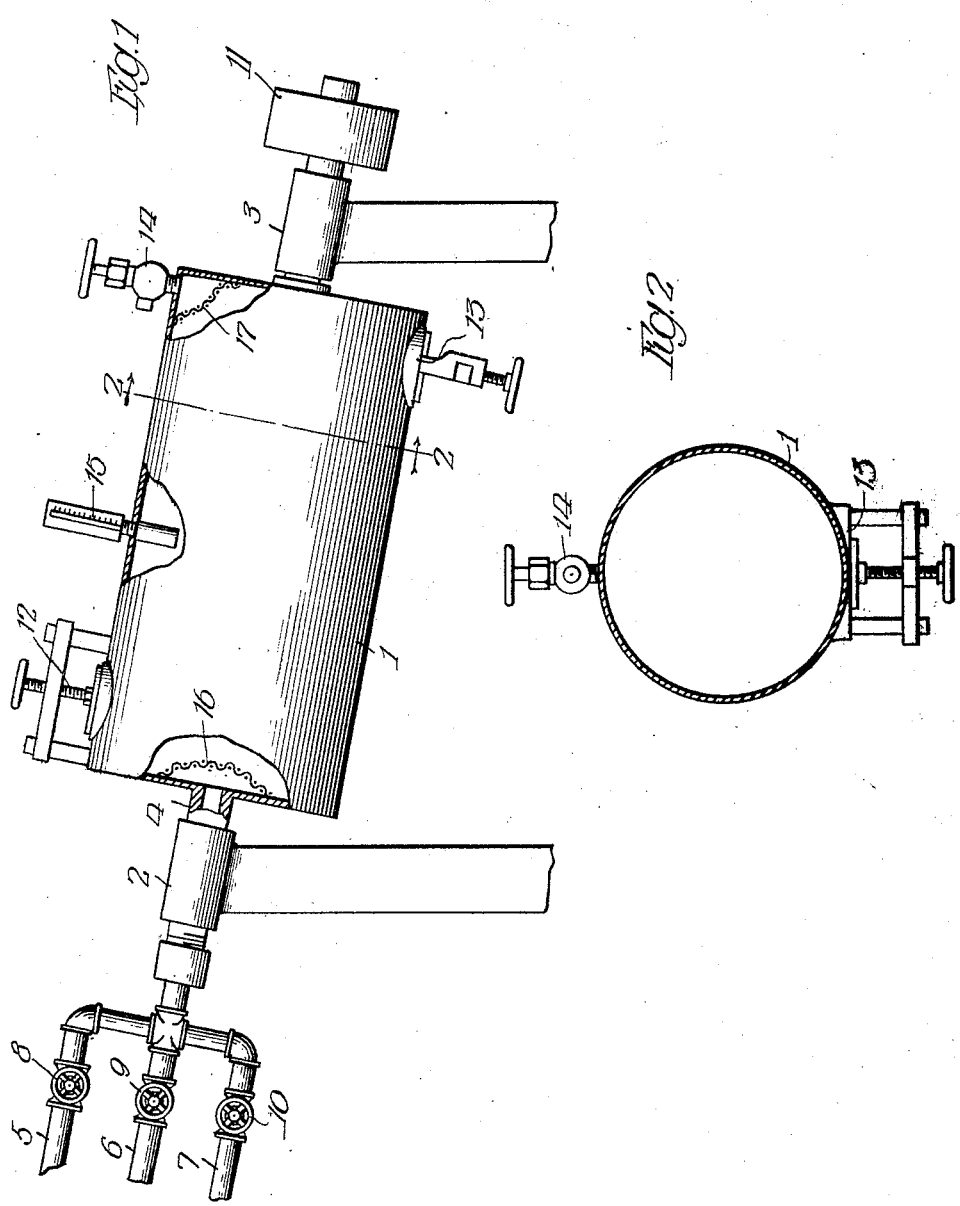
Inventor
W. P. Thornton
By Arthur F. Durand Oct. 21, 1924.
W. P. THORNTON
1,512,320
PROCESS OF EXTRACTING SULPHUR FROM ORE
Filed June 4, 1919   3 Sheets-Sheet 2
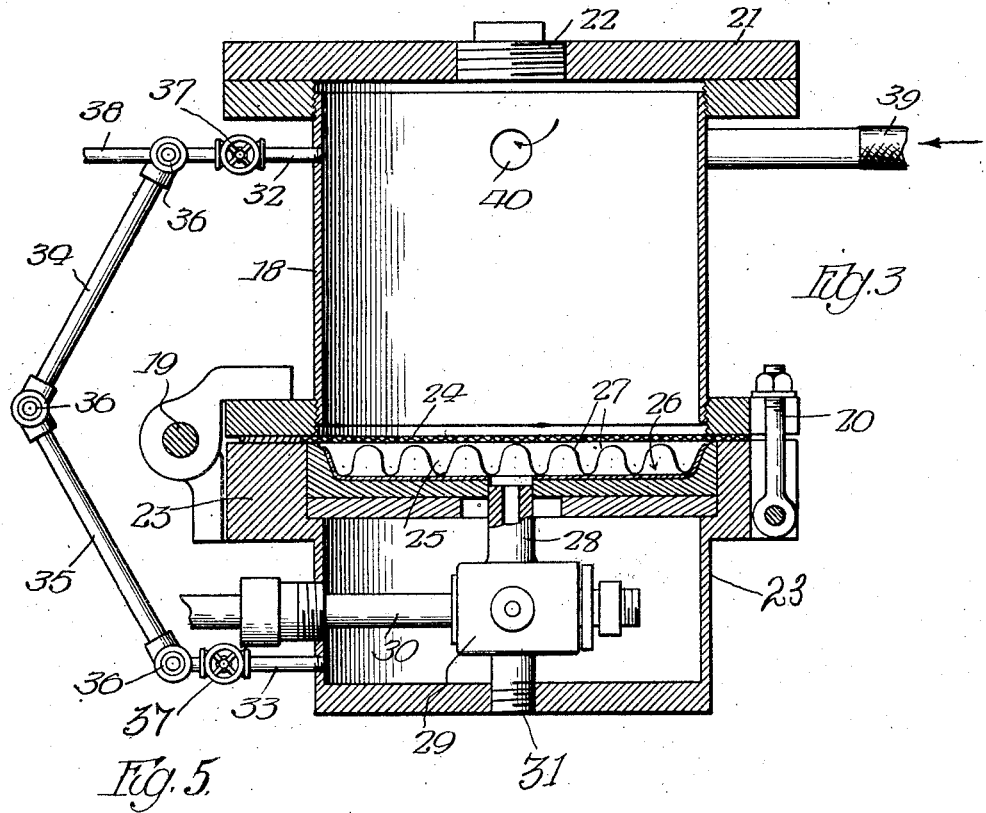
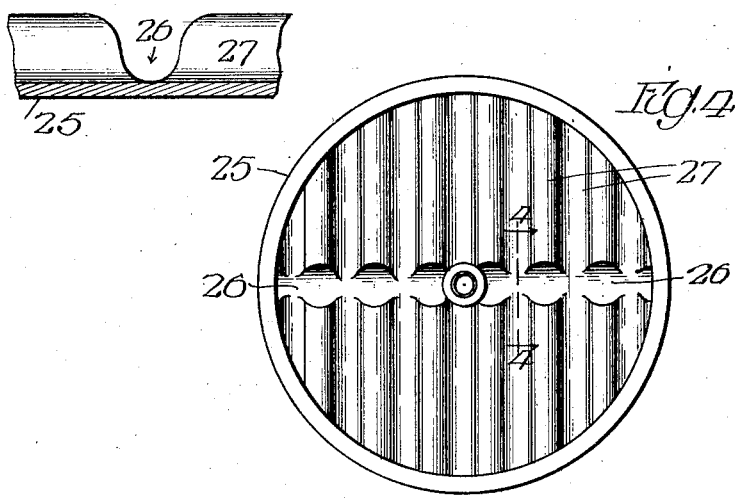
Inventor
W. P. Thornton
By Arthur F. Durand
Atty.

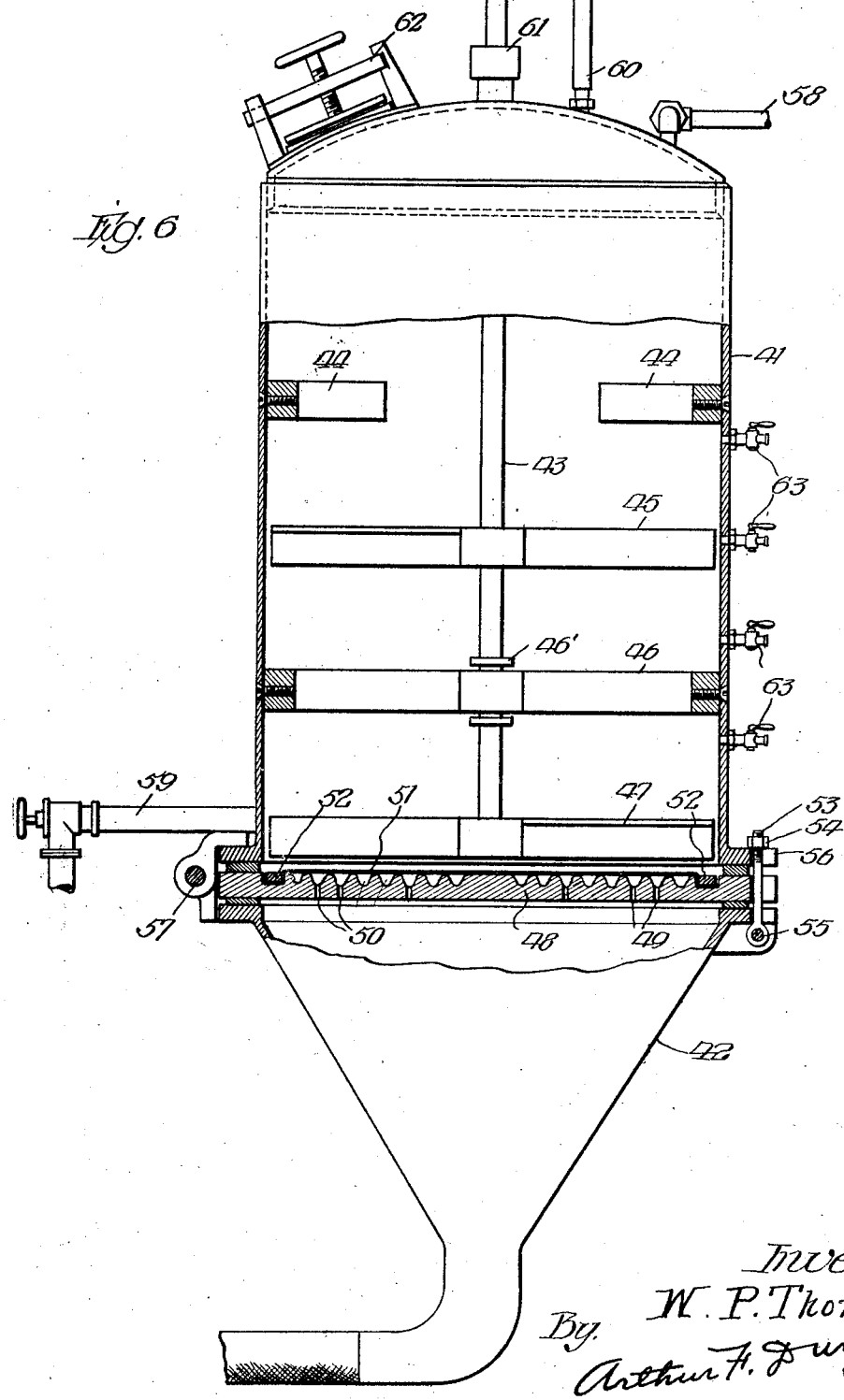

Patented Oct. 21, 1924.

1,512,320

UNITED STATES PATENT OFFICE.

WILLIAM P. THORNTON, OF CHICAGO, ILLINOIS.

PROCESS OF EXTRACTING SULPHUR FROM ORE.

Application filed June 4, 1919. Serial No. 301,687.

*To all whom it may concern:*

Be it known that I, WILLIAM P. THORNTON, a citizen of the United States of America, and a resident of Chicago, Illinois, have invented a certain new and useful Improvement in Processes of Extracting Sulphur from Ore, of which the following is a specification.

This invention relates to a process for extracting sulphur from ore. In my prior application, Serial No 284,780, filed March 24, 1919, an apparatus and process for this purpose are shown and described.

The invention of the present application is, therefore, in the nature of an improvement upon the process and apparatus shown and described in said prior application.

Generally stated one object of this invention, as hereinafter set forth, is to provide suitable means for, and a method of, handling sulphur ore containing more or less dirt or earthy matter, so as to avoid the clogging of the apparatus, when a straining or filtering operation, or some other expedient, is employed to separate the melted sulphur from the ore, and whereby certain other desirable results are obtained, as will hereinafter more fully appear.

It is also an object to provide certain details and features of improvement which will tend to increase the general efficiency and the desirability of this particular method of extracting sulphur from ore, and more especially, as previously stated, to facilitate the extraction of sulphur from ore containing a considerable percentage of dirt or earthy matter.

To these and other useful ends the invention consists in matters hereinafter set forth and claimed, and shown in the accompanying drawings, in which—

Fig. 1 is a side elevation, partly in section, showing a tumbling barrel which may be employed for performing one or more of the steps involved in a process or method embodying the principles of the invention.

Fig. 2 is a transverse section on line 2—2 in Fig. 1.

Fig. 3 is a vertical section of a strainer or filter by which sulphur mixed with dirt is melted and finally separated from the dirt or earthy matter.

Fig. 4 is a plan view of the corrugated plate forming the bottom of said strainer or filter.

Fig. 5 is an enlarged detail or fragmentary sectional view showing a portion of said bottom plate.

Fig. 6 is a side elevation, partly in section, showing a retort or apparatus in which the ore and its sulphur are treated, in the manner clearly disclosed in said prior application, as one or more of the steps involved in the general method of extracting the sulphur from the ore.

As thus illustrated, the apparatus employed in practicing the invention comprises, as shown in Fig. 1, a receptacle 1 in the form of a rotary tumbling barrel which is mounted in bearings 2 and 3, preferably in such manner that the receptacle rotates about an inclined axis. The journal 4 which rotates in the bearing 2 is hollow and is connected to pipes 5, 6 and 7, which are controlled, respectively, by valves 8, 9 and 10, for the purpose hereinafter more fully explained. A pulley 11 is connected with the other end of the receptacle, and may have a belt applied thereto for the purpose of rotating the receptacle at the required speed. A hand hole 12 of any suitable character is provided in the side of the receptacle adjacent the upper end thereof, and another hand hole 13 is provided on the opposite side of the receptacle, near the lower end thereof. A discharge valve 14 is arranged opposite the hand hole 13, and a thermometer 15 is applied to the receptacle in any suitable or desired manner. Gratings 16 and 17, of suitable character, are provided within the receptacle to protect the bore of the journal 4 and the opening communicating with the valve 14, thereby to prevent clogging of these passages. The receptacle thus constructed and mounted is employed for preliminarily washing the sulphur ore, prior to the treatment set forth in said prior application. It will also be seen, as will hereinafter more fully appear, that this rotary receptacle or tumbling barrel may, when the conditions are favorable, be employed for extracting the sulphur from the ore, and for separating sulphur from dirt and earthy matter mixed therein.

In Fig. 3 is shown an apparatus for steaming sulphur mixed with dirt and earthy matter, thereby to melt the sulphur and separate it from the dirt and earthy matter. As shown, this apparatus comprises a receptacle 18 having its lower end provided with a hinge 19 at one side, and having one or more locking bolts 20, and a removable cover 21 at its upper end. This cover is preferably provided with a screw plug 22 which can be removed to introduce the mixture of sulphur and earthy matter into the receptacle. Between the bottom of the receptacle and the base 23 a screen or filtering medium 24 is stretched and clamped, this screen or filtering medium being of any suitable character, such as cotton gauze or wire cloth or the like. A plate 25 is held below the said screen or filtering medium, this plate being formed with a groove 26 which communicates with the transverse grooves 27, and which also communicates at its center with the discharge pipe 28 leading to the valve 29, which latter has a steam pipe 30 leading thereto. This valve, it will be understood, is so constructed that when turned to one position the steam will be admitted through the pipe 28 to the space below the screen 24, so that the steam will pass upwardly into the receptacle; but when the valve is turned to another position then the steam is cut off and a discharge passage is provided downwardly through the pipe 28 and through the valve and the lower discharge pipe 31 to the atmosphere. This hollow base 23 provides a chamber for said valve, as shown, and suitable provision may be made so that steam may be normally admitted to this chamber to keep the structure hot. The base 23 may be provided with a blow-off or discharge valve to allow the steam to escape and to drain the water of condensation from the chamber. A steam pipe 32 leads to the upper portion of the receptacle 18 and a similar steam pipe 33 leads to the interior of the base 23, and these two pipes are connected together by pipes 34 and 35 through the medium of swing bolts 36, thereby permitting the base 23 to swing downward when released by the locking bolt 20, in a manner that will be readily understood. Valves 37 are provided in the pipes 32 and 33 and a steam supply pipe 38 leads to the upper swing joint 36, and thereby communicates with the pipes 32 and 34, so that steam may be supplied to the interior of the base 23, as stated, as well as to the top of the receptacle 18 which receives the mixture of sulphur and earthy matter. This apparatus is employed when the sulphur obtained from the ore is mixed with dirt or earthy matter, which must be separated therefrom in order to obtain commercially clean or comparatively pure sulphur.

In Fig. 6 is shown a machine or apparatus similar to that disclosed in said prior application, except that the cooling chamber is not employed below the retort. As shown, the receptacle 41 is of suitable size and character and is arranged to discharge downwardly into a hopper 42 which is adapted to be connected with the pipe 39 as shown in Fig. 3, when it is necessary or desirable to clean the sulphur by eliminating the dirt and earthy matter therefrom. A shaft 43 extends downwardly into the receptacle 41, and stationary agitators or deflectors 44 are secured to the interior of the receptacle, at opposite sides of said shaft; and below these agitators movable agitators 45, in the form of arms, such as those shown and described in said prior application, are secured to said shaft; and a cross-bar 46 is secured to the receptacle to provide a bearing for the shaft 43 and to serve as additional stationary deflectors or agitators so that the mass of ore within the retort or receptacle will be kept loose and in the required condition during the rotation of the shaft; and to assist in this direction, arms or agitators 47 are secured to the lower end of the shaft immediately above the perforated plate 48, which latter has discharge openings or perforations 49 therein as well as circular grooves 50 which conduct the melted sulphur and water to said openings. A screen or filtering medium 51 is stretched over said plate, thereby to support the bed of ore within the retort or receptacle, and this screen or filtering medium is held down by a clamping ring 52 secured in place in any suitable manner. Locking bolts 53 are provided with clamping nuts 54 to hold the receptacle or retort in place, and are pivoted at 55 to swing into and out of the notch 56 in the lower edge of the receptacle, and at one side the receptacle has a hinge 57, whereby the hopper 42 and the plate 48 and its screen 51 may swing downward when it is desired to discharge the ore from which the sulphur has been extracted or exhausted by the hot water. A steam pipe 58 leads to the top of the receptacle, and a blow-off pipe 59 leads to the bottom portion thereof. A thermometer 60, as usual, is applied to the top of the retort or receptacle, and a stuffing box 61 is provided for the shaft 43, so that the latter will turn in upper and lower bearings. A suitable hand hole 62 is provided at the top of the retort or receptacle, so that the sulphur ore may be introduced into the retort in the required manner. Suitable valves 63 are provided at different heights on the side of the receptacle for testing the conditions during the process of extracting the sulphur from the ore. This machine or apparatus is employed, it will be understood, when the machine or apparatus shown in Fig. 1 is employed for washing the ore, and for merely separating the dirt and earthy matter from the ore, and for partly melting out the sulphur, so that clean ore, with more or less sulphur melted therefrom, may be placed in the retort 41 for further treatment without danger of clogging the cloth or filtering medium 51, and without danger of clogging the openings 49 through which the melted sulphur and hot water must be discharged downwardly.

One modus operandi is as follows: The hand hole 12 is opened and sulphur ore is placed in the tumbling barrel until it is approximately one-half full, and the hole is then closed. The ore may be of any suitable character, but that which will pass through a one-half inch sieve or grating has been found to be satisfactory. The ore may be screened previously, if desired, to remove the large lumps which contain very little or practically no sulphur. Water is then introduced into the tumbling barrel from the hot water pipe 6 by opening the valve 9, and after the valve is closed the tumbling barrel is then rotated, and it may be rotated also prior to the introduction of the water. If the temperature of the water is not high enough, the valve 8 is opened to admit steam until the temperature of the ore and water in the tumbling barrel is above the temperature of melted sulphur. A temperature of about two hundred and sixty degrees Fahrenheit may be employed, and also as high as two hundred and eighty degrees Fahrenheit will serve the purpose. The temperature may be maintained at the proper point by the admission of steam from time to time, in a manner that will be readily understood. Sufficient water should be in the tumbling barrel to wet and soak the ore, but in practice it is preferable to fill the barrel or receptacle substantially full of water. The barrel is then rotated until the sulphur is melted, to some extent at least, out of the ore. As the sulphur is melted out of the ore, a considerable portion of the ore becomes softened in water and the substance, when it settles in the water, resembles mud. So long as the temperature is kept above the melting point of sulphur, all of the sulphur within the tumbling barrel will remain a liquid, and after this operation has been kept up for the required time, which can be determined by experiment, the tumbling barrel is allowed to cool off. Preferably, this is accomplished by turning the barrel until the valve 14 is above the level of the ore and below the level of the surface of the water. Then, by opening this valve, a portion of the hot water may be drawn off, along with sufficient steam to relieve the pressure and lower the temperature to a few degrees above the melting point of sulphur. This can be done without drawing off any substantial portion of the melted sulphur, because the sulphur is heavier than water, and being of greater specific gravity, sinks to the bottom. After this, the tumbling barrel is again rotated and cold water is introduced therein, by opening valve 10, thus cooling the contents of the barrel to a point below the melting point of sulphur.

Preferably this is done so that the contents of the barrel will be reduced to the temperature of boiling water at atmospheric pressure, or a little lower. This causes the sulphur to solidify or harden in grains or lumps, and the richer the ore the larger the lumps. The object of rotating the tumbling barrel while cooling below the melting point of sulphur is to prevent the sulphur from hardening into a large lump or a solid mass, which would be liable to happen if the mass of ore were not agitated during the cooling operation. It would be no departure from my invention if, prior to the cooling step, a portion of the melted sulphur was drawn off and only the remaining sulphur, hot water and ore mass cooled as above stated. After this step of cooling the contents of the receptacle, the barrel is stopped with the valve 14 at its lowest point, and the valve is then opened and the water is drawn off from the tumbling barrel. The sulphur which has formed in grains or lumps is not held in suspension by the water, and does not to any great extent pass out with the water. A sieve can be employed, if necessary, to catch and recover any granules of sulphur that may be discharged with the water. After the water and earthy substances held in suspension in the water have been discharged from the tumbling barrel, the remaining contents of the barrel should be subjected to a further washing operation. This can be conveniently done by admitting either hot or cold water and then rotating the tumbling barrel and again drawing off the water through the valve 14 as previously described. This washing process can be repeated until the contents of the barrel are substantially free from mud or earthy substances or matter of similar nature. Some sulphur may pass out, but only a small percentage. After the earthy matter and mud have thus been removed from the mass of sulphur and ore in the tumbling barrel, the sulphur itself may be separated or extracted or recovered from the mass in the manner fully described in said prior application, or the desired result may be accomplished by placing the clean ore and sulphur in the retort 41 shown in Fig. 6, and by rotating the shaft 43 and passing the hot water at a temperature above the melting point of sulphur downwardly through the mass or bed or ore, so that the sulphur will be melted and discharged downwardly through the screen 51 and the openings 49 along with the hot water; and, if the sulphur is found to be mixed more or less with dirt or earthy matter which may not have been washed out of the ore, it can then be treated in the machine or apparatus shown in Fig. 3, by first adjusting the valve 29 to blow steam upwardly through the mass of sulphur and other substances, thereby to start the operation of melting the sulphur, and after that the valve 37 is opened to admit steam above the mass of sulphur and other substances, so that the melted sulphur will be driven downwardly through the screen 24 into the grooves 25, and from the latter into the groove 26 and then into the pipe 28 and downwardly through the discharge pipe 31, the valve 29 having been adjusted for this purpose. It will also be seen that, during the discharge of the water and melted sulphur and other substances from the pipe 39 into the receptacle 18, the water can overflow from an opening 40 provided with a valved pipe of any suitable character, so that the water can be allowed to escape and leave the mass of sulphur and earthy matter or mud in the receptacle. Again, if desired, the clean ore and melted or partially melted sulphur obtained by treatment of the ore in the tumbling barrel may simply be allowed to remain in the latter, and hot water may be introduced at a temperature above the melting point of sulphur. A temperature of two hundred and fifty-six or two hundred and fifty-eight degrees Fahrenheit will answer the purpose, and after the sulphur is melted by the hot water the melted sulphur and water may be drawn off by opening the valve 14. Preferably the valve 14 is closed after drawing off a portion of the sulphur and water, and the barrel is then rotated, thereby to more thoroughly wash out the melted sulphur from the ore, and this operation is repeated until no further sulphur can be drawn off, thus leaving the dead or exhausted ore within the barrel. If the sulphur thus recovered is not perfectly clean, it may be subjected to a cleaning operation in the machine or apparatus shown in Fig. 3, in the manner previously described. The residue in the tumbling barrel can be removed by opening the hand hole 13 which is at the lower end of the barrel.

The tumbling barrel may also be used as follows: After the ore is introduced into the tumbling barrel, water and steam, if necessary, are then admitted to the interior of the barrel, and the latter is then rotated until the separation of the sulphur from the ore is accomplished; then, without cooling the barrel or its contents, the liquid within the barrel, including the liquid or melted sulphur, hot water and earthy matter held in suspension in the water, is drawn off by opening the valve 14 after the barrel is positioned to bring the valve at the bottom thereof. Preferably, only a portion of the liquid is withdrawn, and the valve is then closed, and the tumbling barrel is rotated. More of the liquid is then drawn off, and this operation is repeated a number of times until no more sulphur can be obtained by the opening of the valve. The discharge of the melted sulphur into the atmosphere causes it to harden or solidify. The water discharged with the sulphur and other substances is poured off, and the resulting product is a mixture of mud and sulphur. The sulphur may now be steamed or melted out of this mixture, if the mixture is rich enough, in the manner explained in said prior application, or by means of the machine or apparatus shown in Fig. 3, in the manner explained. Also, this product may be allowed to accumulate until there is enough to charge the tumbling barrel, this product being ordinarily called dirty sulphur; and after being thus placed in the tumbling barrel the mixture is then treated exactly as the ore would be treated, and as previously explained, thus further concentrating the sulphur before attempting to strain it or filter it by means of the apparatus shown in Fig. 6, or by means of the apparatus shown in Fig. 3; but when thus again treated in the tumbling barrel the sulphur is freed of a considerable amount of the dirt or earthy matter and mud, and may be steamed and strained in the manner described.

After the ore has been treated in the tumbling barrel shown in Fig. 1, in hot water, so that at least a certain amount of sulphur has been melted out of the ore, and then after the mud and dirt and earthy matter have been washed out, leaving the ore and sulphur clean, the ore and sulphur can then be separated by means of a sieve, to some extent at least, inasmuch as the sulphur, with ordinary ore, develops in the form of small granules which will pass through the meshes of the screen, leaving the coarse rock or exhausted ore in the screen, or at least the larger pieces of the rock or ore. In this way, a large percentage of the rock or exhausted ore will be eliminated, leaving a minimum amount of ore or rock with the sulphur to be treated by the method shown in said prior application, or in the machine or apparatus shown in Fig. 6, thus reducing the expense and decreasing the amount of rock or foreign substance which must be placed in the straining or filtering machine along with the sulphur.

In the different methods described, or the different ways of using the tumbling barrel and other instrumentalities, to melt the sulphur out of the ore and finally recover the sulphur, it will be seen that water is always used at some stage of the process to produce the desired effect therein. For example, in each method described, hot water is used to melt the sulphur out of the ore, and to soften the earthy and other like substances, so that the entire mass of ore rock, melted sulphur and mud is tumbled about in the tumbling barrel until all of the sulphur is melted and reduced to liquid form. Thereafter, if desired, water is again used, at a lower temperature, to wash the mud out of the tumbling barrel, leaving the ore rock and melted sulphur fairly clean and free from earthy or other matter. Again, hot water is used in filtering the sulphur out of the ore rock or out of the muddy mass of sulphur, depending upon which method is employed, and in this filtering operation the melted sulphur in liquid form is transferred from an area under pressure to an area of less pressure, inasmuch as the pressure above the filtering medium is preferably greater than the pressure below, so that the melted liquid sulphur is driven downwardly by fluid pressure as well as by gravity. As stated, however, in each case, and regardless of which form of the process is employed, the original ore mass is tumbled about in a body of hot water in a tumbling barrel, and during this tumbling action all of the melted sulphur or sulphur melted out of the ore remains in the tumbling barrel and is, therefore, maintained in constant agitation, as the liquid sulphur itself is swashed around and tumbled about, along with the mud and earthy matter, and also the ore rock, until all of the sulphur is melted. The melted sulphur cannot accumulate in any stationary position, or in any place where it is not subject to tumbling action, as the use of the hot water to filter the melted sulphur occurs, in each method or process described, after the sulphur has been removed from the tumbling barrel. In one case the sulphur remains with the clean ore rock, and is removed therewith, and in another case the sulphur and mud are segregated together. The clean ore rock and sulphur are placed in the filtering machine, as described, after being removed from the tumbling barrel, or the earthy matter and mud and sulphur are placed in the filtering machine after being withdrawn from the tumbling barrel. Also, as described, the clean ore rock and sulphur, when segregated together, may be treated again in the tumbling barrel, and the melted sulphur and water drawn off, producing fairly clean and pure sulphur, but this can also be filtered if necessary. Also, as explained, the mass of mud and sulphur taken from the tumbling barrel by the other method, or sulphur and earthy matter, can be run through the tumbling barrel again, before being placed in the filtering machine. As explained, though, and regardless of which form of the invention is employed, the original ore mass is first subjected to a tumbling barrel operation, or to a tumbling action in a body of violently agitated hot water, so that the entire mass of sulphur-bearing ore, and the accumulated melted sulphur and mud and the residual ore rock, are all tumbled about together in the same body of hot water, so that in this way the sulphur melted out of the ore continues to be subject to the same tumbling barrel motion to which the mud and ore rock are subjected, until this step of the process is complete.

In any case, therefore, the sulphur is melted a plurality of times (by moisture heat, either water or steam, or both) at different stages of the process of gradual elimination of other matter to produce a commercial product.

An important aspect of the invention, it will be seen, is that the process requires no preliminary treatment of the ore mass, except that it be broken or crushed into lumps or granules small enough to facilitate the carrying out of the process and method shown and described, in the manner explained.

What I claim as my invention is:—

1. The process of extracting sulphur from ore, comprising suitable treatment with water including the step of washing to eliminate the dirt or mud or earthy matter, leaving the ore mass with its sulphur clean for further treatment; the formation of a suitable bed or strata of the washed ore matter and sulphur, and the supplying of hot water on top of said bed, so that the hot water will pass downwardly through the bed or strata, the water being hot enough to melt the sulphur and cause it to flow in liquid condition; and thereafter recovering the sulphur.

2. A process as specified in claim 1, said water treatment being accomplished by agitation of the ore in water hot enough to either partially or entirely melt the sulphur out of the ore, and being followed by a reduction of the temperature and sufficient agitation to solidify the melted sulphur in lumps.

3. A process as specified in claim 1, said first mentioned water treatment including the melting of the sulphur and thereafter a reduction of the temperature sufficient to solidify the melted sulphur before the separation thereof from the ore by the said subsequent treatment.

4. A process as specified in claim 1, in combination with the step of melting the sulphur previous to said first washing treatment, and including a filtering operation or straining action directly below the said bed or strata to hold back as much as possible everything except the water and melted sulphur.

5. The process specified in claim 1, in combination with the step of melting the sulphur previous to said first washing treatment, and comprising the subsequent step of passing steam upwardly through a mass of the recovered sulphur mixed with earthy matter, then passing steam downwardly through said mass, and filtering or straining the melted sulphur away from the bottom of the mass.

6. The process of extracting sulphur from ore, in which the sulphur is melted a plurality of times at different stages of the process of gradual elimination of other matter, comprising suitable treatment with water including the tumbling about of the ore mass in water, thereby to soften and hold more or less in suspension the dirt and mud and earthy matter contained in the mass, thereafter separating the portion of the mass which contains the sulphur from the water and other matter, agitating and allowing the sulphur to cool in granular form, and finally flowing the sulphur in melted condition away from the matter with which it was segregated from the original mass.

7. The process of extracting sulphur from ore, in which the sulphur is melted a plurality of times at different stages of the process of gradual elimination of other matter, comprising suitable treatment with water including the step of washing to eliminate the dirt and earthy matter, agitating and allowing the sulphur to cool in granular form, and thereafter treating that portion of the mass containing the sulphur with water hot enough to melt out the sulphur and flowing the melted sulphur away from the other matter with which it was segregated from the original mass.

8. A process as specified in claim 6, said water treatment being performed with hot water to melt the sulphur more or less, and the temperature being lowered after this operation to solidify the sulphur in lumps.

9. The process of extracting sulphur from ore, in which the sulphur is melted a plurality of times at different stages of the process of gradual elimination of other matter, comprising the treatment of the ore with hot water to wash out the dirt and earthy matter, and to melt out the sulphur, thereafter cooling the mass and leaving the sulphur in granules mixed with the rock or ore, passing the sulphur granules and smaller pieces of rock or ore through a sieve, thereby eliminating the larger portions of the rock or ore and reducing the amount of rock or foreign substance remaining with the sulphur, and thereafter separating the sulphur from the remaining ore rock or other foreign substance.

10. The process of extracting sulphur from ore, in which the sulphur is melted a plurality of times at different stages of the process of gradual elimination of other matter, comprising the use of heat to melt the sulphur in the ore, and agitating and allowing the sulphur to cool in granular form, thereafter transferring the sulphur at some stage of the process from an area under pressure to an area of less pressure, by filtering the sulphur in melted condition from one area to the other, and ultimately recovering the sulphur, said process also involving the use of water at some stage thereof to produce the desired effect therein, by tumbling the ore rock and melted sulphur and mud about in a tumbling body of water, keeping the sulphur and other elements in a constant state of agitation in the same tumbling body of water before said final recovery of the sulphur.

11. The process of extracting sulphur from ore, in which the sulphur is melted a plurality of times at different stages of the process of gradual elimination of other matter, comprising the establishment of an area of confinement for the ore mass, charging the ore directly into said area, supplying water directly to said area, so that both the ore mass and the water are restrained by the limits of said area, maintaining said area at a temperature to melt the sulphur in said ore, whereby the ore is reduced to a mass of melted sulphur and mud and other matter thus held under restraint, tumbling the entire body of water and mass of ore rock and mud and melted sulphur about in said area, so that the gradually accumulating melted sulphur is maintained in a state of constant agitation, dismissing out of said mass some of the elements thereof, by discharging these elements with water from said area, and finally recovering the sulphur.

12. In a process for the extraction of sulphur from ore, the steps of melting the sulphur in the ore, by tumbling the entire mass of ore rock and mud and melted sulphur about in a body of hot water, so that the gradually accumulating melted sulphur is maintained in a state of constant agitation, using water at some stage of the process to wash away earthy or other matter, and agitating and allowing the sulphur to cool in granular form.

13. In a process for the extraction of sulphur from ore, the steps of using hot water to soften the mud or other matter and melt the sulphur in the ore, by subjecting the entire mass of ore rock and mud and melted sulphur to a tumbling action in a body of hot water, so that the gradually accumulating melted sulphur is maintained in a state of constant agitation, and agitating and allowing the sulphur to cool in granular form, and thereafter filtering the sulphur from a high pressure area to a low pressure area to free the same from other matter.

14. In a process for the extraction of sulphur from ore, the steps of supplying hot water to the ore to melt the sulphur therein, and to soften the mud or other matter, tumbling the entire mass of ore rock and melted sulphur and mud about in a body of hot water, and filtering the sulphur at some stage of the process, so that the sulphur is separated from other matter, the filtration being accomplished by gravity augmented by fluid pressure.

15. The process of extracting sulphur from ore, in which the sulphur is melted a plurality of times at different stages of the process of gradual elimination of other matter, comprising the washing of sulphur-bearing ore in hot water to melt out the sulphur, whereby the melted sulphur and the mud and the ore rock are all tumbled about in a body of hot water, so that all of the gradually accumulating melted sulphur is maintained in a state of constant agitation, using water to wash out the mud or earthy matter, leaving the ore rock and sulphur together, and thereafter recovering the sulphur.

16. The process of extracting sulphur from ore, in which the sulphur is melted a plurality of times at different stages of the process of gradual elimination of other matter, comprising the subjecting of the ore mass to heat to melt the sulphur, allowing the ore mass to cool and harden the sulphur, washing the mud from the cooled ore mass, the formation of a suitable bed or strata of washed ore and sulphur, the passing of hot water through said bed or strata to melt out the sulphur, and thereafter recovering the sulphur.

17. A process as described in claim 20, said first heat treatment being performed by agitating the ore in hot water.

18. The process of extracting sulphur from ore, in which the sulphur is melted a plurality of times at different stages of the process of gradual elimination of other matter, comprising the steps of subjecting the ore mass to heat to melt the sulphur therein by using hot water, and thereafter cooling the mass and washing out the mud and earthy or other matter, so as to leave the ore rock and sulphur clean, and thereafter recovering the sulphur.

19. The process of extracting sulphur from ore which comprises the steps of subjecting the ore mass to heat to melt the sulphur, allowing the ore mass to cool, washing the mud from the cooled ore mass, and thereafter recovering the sulphur.

20. The process of extracting sulphur from ore which comprises the steps of subjecting the ore mass to heat to melt the sulphur, allowing the ore mass to cool, washing the mud from the cooled ore mass, reheating the residual ore mass to liquefy the sulphur, and finally recovering the sulphur from the ore rock.

21. The process of extracting sulphur from ore which comprises the steps of subjecting the ore mass to moisture and heat to melt the sulphur, allowing the ore mass to cool, washing the mud from the cooled ore mass, and thereafter recovering the sulphur.

22. The process of extracting sulphur from ore which comprises the steps of heating the ore mass in the presence of a liquid at a temperature higher than the melting point of sulphur, allowing the ore mass to cool, washing the mud from the cooled ore mass, and thereafter recovering the sulphur.

23. The process of extracting sulphur from ore which comprises the steps of heating the ore mass in the presence of a liquid at a temperature higher than the melting point of sulphur, agitating the ore mass in the presence of the heated liquid, allowing the ore mass to cool, washing the mud from the cooled ore mass, and thereafter recovering the sulphur.

24. The process of extracting sulphur from ore which comprises the steps of agitating the ore mass in the presence of a liquid at a temperature higher than the melting point of sulphur, allowing the ore mass to cool, washing the mud from the liquid ore mass, reheating the residual ore mass to liquefy the sulphur, and finally recovering the sulphur from the ore rock.

25. The process of extracting sulphur from ore which comprises the steps of agitating the ore mass in the presence of water and steam under pressure and at a maintained temperature higher than that of the melting point of sulphur, allowing the ore mass to cool below the melting point of the sulphur, washing the mud from the ore mass at atmospheric pressure, and thereafter recovering the sulphur from the ore rock.

26. The process of extracting sulphur from ore which comprises the steps of forcing water under greater than atmospheric pressure into the ore mass and at a temperature higher than that of the melting point of sulphur, allowing the ore mass to cool below the melting point of the sulphur, subjecting the cooled ore mass to a flow of washing water at atmospheric pressure, and finally recovering the sulphur from the residual ore mass.

27. The process of extracting sulphur from ore which comprises the steps of forcing water under greater than atmospheric pressure into the ore mass and at a temperature higher than that of the melting point of sulphur, allowing the ore mass to cool below the melting point of the sulphur, subjecting the cooled ore mass to a flow of washing water at atmosheric pressure, reheating the residual ore mass to melt the sulphur, and thereafter recovering the molten sulphur from the ore rock.

28. The process of extracting sulphur from ore which comprises the steps of subjecting the ore mass in a closed container to water under pressure, heated to a temperature greater than that of the melting point of sulphur, agitating the ore mass in the presence of the heated water, allowing the ore mass to cool below the melting temperature of sulphur, flushing the ore mass under atmospheric pressure with wash water, and thereafter recovering the sulphur from the residual ore mass.

29. The process of extracting sulphur from ore which comprises the steps of subjecting the ore mass in a closed container to water under pressure heated to a temperature greater than that of the melting point of sulphur, agitating the ore mass in the presence of the heated water, allowing the ore mass to cool below the melting temperature of sulphur, flushing the cooled ore mass under atmospheric pressure with wash water, removing the resultant ore mass from said container and transferring it to a separating chamber, and finally recovering the sulphur from the ore rock in said separating chamber.

30. The process of extracting sulphur from ore which comprises the steps of subjecting the ore mass in a closed container to water under pressure heated to a temperature greater than that of the melting point of sulphur, agitating the ore mass in the presence of the heated water, allowing the ore mass to cool below the melting temperature of sulphur, flushing the ore mass under atmospheric pressure with relatively cool washing water, removing the resultant ore mass from said container and transferring it to a separating chamber, reheating the residual ore mass in said second chamber to liquefy the sulphur, and finally separating the liquefied sulphur from the ore rock.

31. The process of extracting sulphur from ore which comprises the successive steps of heating the ore mass to liquefy it, washing the ore mass at a temperature below the melting point of the sulphur, and finally recovering the sulphur from the residual ore mass.

32. The process of extracting sulphur from ore, which comprises the melting of the sulphur in the ore, thereafter agitating and cooling the ore mass, so that the melted sulphur will cool in granular form, and ultimately recovering the sulphur.

WILLIAM P. THORNTON.